(12) United States Patent
Wang et al.

(10) Patent No.: US 9,083,871 B2
(45) Date of Patent: Jul. 14, 2015

(54) PLANT IMAGE CAPTURE DEVICE AND IMAGE CAPTURE METHOD THEREOF

(75) Inventors: Szu-Hsuan Wang, Kaohsiung (TW); Yung-Hsing Peng, Kaohsiung (TW)

(73) Assignee: Institute for Information Industry, Taipei (TW)

(*) Notice: Subject to any disclaimer, the term of this patent is extended or adjusted under 35 U.S.C. 154(b) by 877 days.

(21) Appl. No.: 13/328,078

(22) Filed: Dec. 16, 2011

(65) Prior Publication Data

US 2013/0113922 A1 May 9, 2013

(30) Foreign Application Priority Data

Nov. 9, 2011 (TW) .............................. 100140865 A (51) Int. Cl.
*H04N 7/18* (2006.01)
*H04N 5/225* (2006.01)
*H04N 5/262* (2006.01)

(52) U.S. Cl.
CPC ............. *H04N 5/2254* (2013.01); *H04N 5/262* (2013.01)

(58) Field of Classification Search
None
See application file for complete search history.

(56) References Cited

U.S. PATENT DOCUMENTS

| | | | | |
|---|---|---|---|---|
| 2,448,084 A | * | 8/1948 | Davis | 396/20 |
| 3,690,242 A | * | 9/1972 | Cruickshank et al. | 396/5 |
| 4,236,795 A | * | 12/1980 | Kephart | 396/5 |
| 6,834,960 B2 | * | 12/2004 | Dbjay | 352/243 |
| 7,039,220 B2 | * | 5/2006 | Kriesel | 382/110 |
| 7,502,174 B2 | * | 3/2009 | Jensen et al. | 359/694 |

* cited by examiner

*Primary Examiner* — Sath V Perungavoor
*Assistant Examiner* — Kate Luo
(74) *Attorney, Agent, or Firm* — Muncy, Geissler, Olds & Lowe, P.C.

(57) ABSTRACT

A plant image capture device and a method thereof are provided. A first mirror is disposed at a side of an image measurement position, so as to generate an mirror image of a plant disposed on the image measurement position; a first image capture device obtains at least one image including a direct image and the first mirror image of the plant; an image processing module uses a frame of the first mirror as a feature, so as to divide the at least one image including the direct image and the first mirror image of the plant and obtain the direct image and the first mirror image of the plant; an operation processing module processes the mirror image of the plant, so as to obtain a first image of the plant.

17 Claims, 10 Drawing Sheets

PLANT IMAGE CAPTURE DEVICE AND IMAGE CAPTURE METHOD THEREOF

CROSS-REFERENCE TO RELATED APPLICATION

This application claims the benefit of Taiwan Patent Application No. 100140865, filed on Nov. 09, 2011, which is hereby incorporated by reference for all purposes as if fully set forth herein.

BACKGROUND OF THE INVENTION

1. Field of Invention

The present invention relates to a plant image capture device and a method thereof, and more particularly to a plant image capture device and a method thereof for obtaining images of a plant in different directions through a first mirror by an image capture device.

2. Related Art

Plant growth monitoring is an important field in large-scale agriculture production, but it is not convenient to obtain a complete plant growth recording image; generally, when a plant growth image is recorded, the image can only be captured and recorded in the direction facing a recorder, and if recording the growth situation of the backside of the plant is required, it can only be achieved with using additional devices, such as adding a camcorder device to shoot in another direction, or adding a movable device to move and rotate the plant and then perform second shooting.

Currently, plant image recording and measurement technology may be categorized into the following two manners. One is to use two camcorders, which respectively perform image shooting and recording from the front side and the upper side of a plant, another one is to mount a rotation disk to perform full-directional shooting on a plant. However, the foregoing manner which two camcorders are used to perform image shooting on a plant from the front side and from the upper side can not obtain an image of the back growth situation of the plant directly. To solve this problem, a currently common processing manner is to mount a third camera at the back of the plant, so as to use this third camera to directly shoot a back image of the plant. This method may simultaneously obtain three pictures of the plant of the front side, the back and the top, so as to conveniently monitor complete growth situation of the plant. However, three cameras must be used at the same time in this method which cost highly.

SUMMARY OF THE INVENTION

The present invention provides a plant image capture device and a method thereof, which use an image capture device, a mirror, and an image restoration technology, without the need of adding an image capture device or a movable device, and may obtain images of a plant in different directions, thereby reducing the cost of the plant image capture device, and improving the convenience of shooting images of the plant in different directions (such as the front side and the back).

The present invention proposes a plant image capture device, comprising a first mirror, a first image capture device, an image processing module and an image processing module. The first mirror is disposed at a side of an image measurement position, so as to generate a first mirror image of a plant disposed on the image measurement position; the first image capture device obtains at least one image comprising a direct image and the first -mirror image of the plant; the image processing module uses a frame of the first mirror as a feature, divides the obtained at least one image and obtains the direct image and the first mirror image; and the operation processing module processes the first mirror image, so as to obtain a first image of the plant.

In an embodiment of the present invention, the first mirror is placed slantwise, so that a back of the plant is slantwise presented in the image obtained by the first image capture device, and the first image is a back image of the plant.

In an embodiment of the present invention, the foregoing image capture device further comprises a second mirror, disposed at another side of the image measurement position, so as to generate a second mirror image of the plant. The first mirror and the second mirror are placed with V shape, the direct image is a top image of the plant, the first mirror image is a back image of the plant, and the second mirror image is a front image of the plant.

The present invention proposes a plant image capture method, whose main steps are as follows: providing a first mirror, disposed at a side of an image measurement position, so as to generate a first mirror image of a plant disposed on the image measurement position; obtaining, by a first image capture device, at least one image comprising a direct image and the first mirror image of the plant; using, by an image processing module, a frame of the first mirror as a feature, dividing the obtained at least one image and obtaining the direct image and the first mirror image; and restoring, by an operation processing module, the first mirror image, so as to obtain a first image of the plant.

In an embodiment of the present invention, the foregoing image capture device and the method thereof further comprise obtaining, by an image correction module, by use of a correction technology for measuring a square paper, a mapping between each cross point of the square paper and a corresponding cross point in an image to be restored of the plant, so that the operation processing module processes the first mirror image of the plant according to the mapping, and obtains the first image of the plant.

In an embodiment of the present invention, in the foregoing square paper correction technology, according to the two-dimensional plane coordinate value of each cross point of the square paper, a first matrix is established; according to the two-dimensional plane coordinate value of each cross point of the square paper in the first mirror image, a second matrix is established; and a mapping between the first matrix and the second matrix is established, so as to serve as a mapping between each cross point of the square paper and a corresponding cross point in an image to be restored of the plant.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the aforementioned features and advantages of the present invention more comprehensible, embodiments are illustrated in detail hereinafter with reference to drawings.

Figure 1:
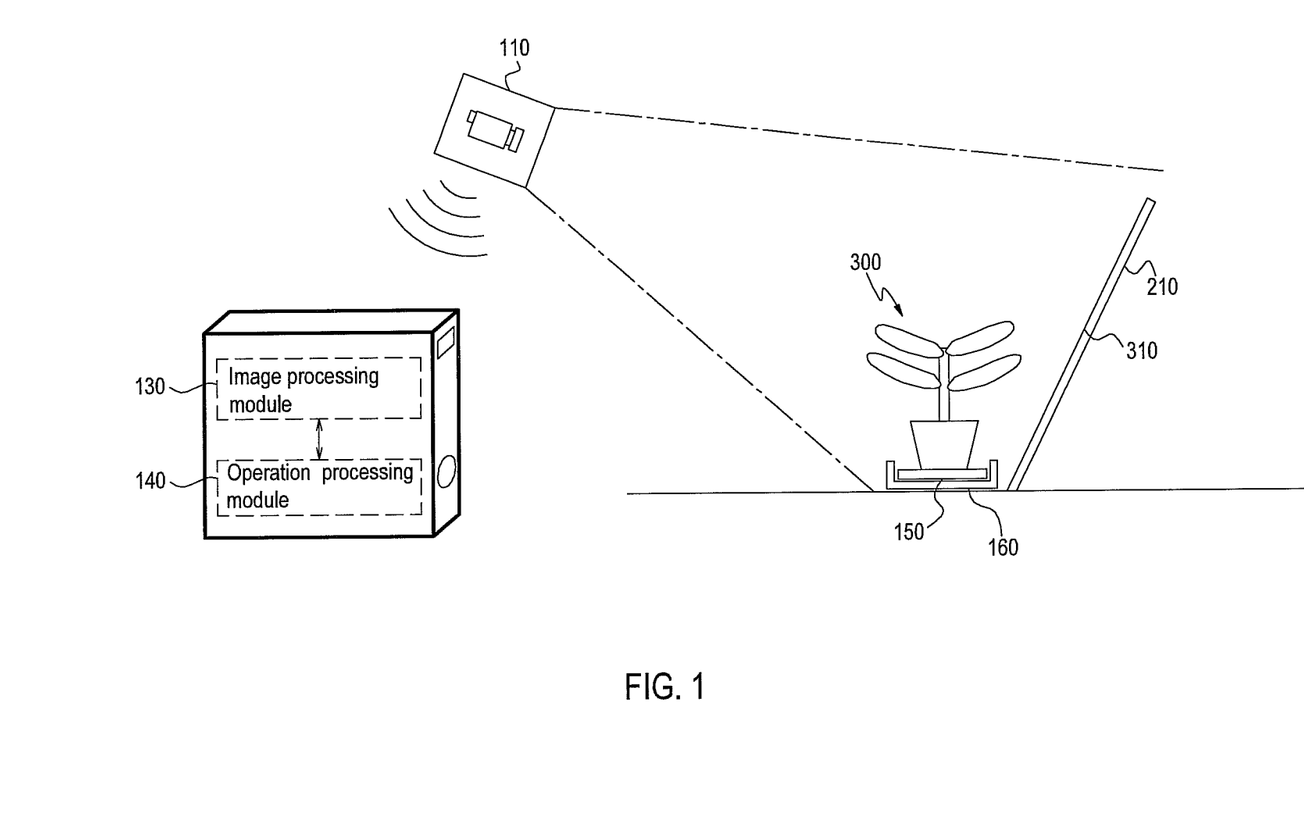
FIG. 1 is a schematic view of an image capture device according to a first embodiment of the present invention.

FIG. 1 is a schematic view of an image capture device according to a first embodiment of the present invention. In FIG. 1, a plant image capture device includes a first mirror 210, a first image capture device 110, an image processing module 130 and an operation processing module 140. The first mirror 210 is disposed at a side of an image measurement position 160, so as to generate a first mirror image 310 of a plant 300 disposed on the image measurement position 160. Still further, the plant 300 may be conveyed to the image measurement position 160 through a conveyor belt 150, and the conveyor belt 150 further may have a positioning device, so that when the conveyor belt 150 conveys the plant 300 to the image measurement position 160, precise positioning may be performed. The first image capture device 110 is used to obtain at least one image including a direct image and the first mirror image of the plant 300; the image processing module 130 uses a frame of the first mirror 210 as a feature, divides the obtained at least one image and obtains the direct image and the first mirror image 310 of the plant 300; and the operation processing module 140 processes the first mirror image, so as to obtain a first image of the plant 300.

In the first embodiment, the first image capture device 110 may be disposed slantwise on the top, and the first mirror 210 may be disposed slantwise, so that the back image of the plant 300 may be slantwise presented in an image obtained by the first image capture device 110, and therefore the first image restored through the operation processing module 140 is the back image of the plant 300. In some embodiments, the first image capture device 110 may be disposed directly on the top, the first mirror 210 may be disposed slantwise, and the first image is also the back image of the plant 300.

Figure 2:
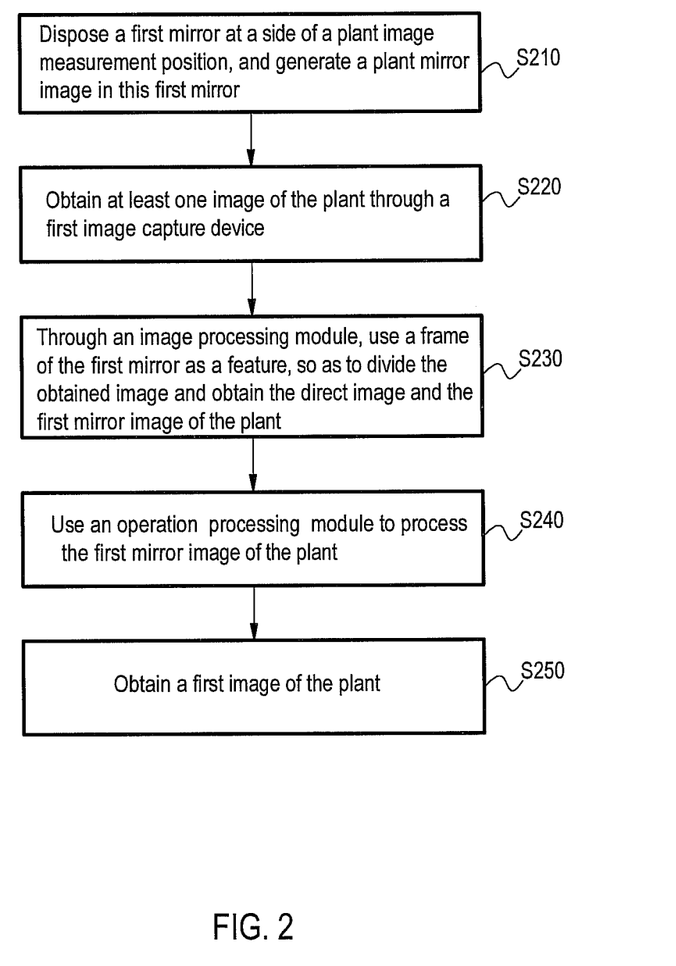
FIG. 2 is a flow chart of steps according to the first embodiment of the present invention.

FIG. 2 is a flow chart of steps according to the first embodiment of the present invention in FIG. 1. Main steps are as follows: a first mirror is disposed at a side of a plant image measurement position, and a plant mirror image, that is, a first mirror image, is generate in this first mirror (step S210). Secondly, at least one image of the plant is obtained through a first image capture device, this image capture module may be a camera, digital camera or camcorder (step S220), and the obtained image includes a direct image and a first mirror image of the plant. Secondly, through an image processing module, a frame of the first mirror is used as a feature, so as to divide the obtained image and obtain the direct image and the first mirror image of the plant (step S230). Secondly, an operation processing module is used to restore the first mirror image of the plant (step S240). Finally, a first image of the plant is obtained (step S250).

Figure 3A:
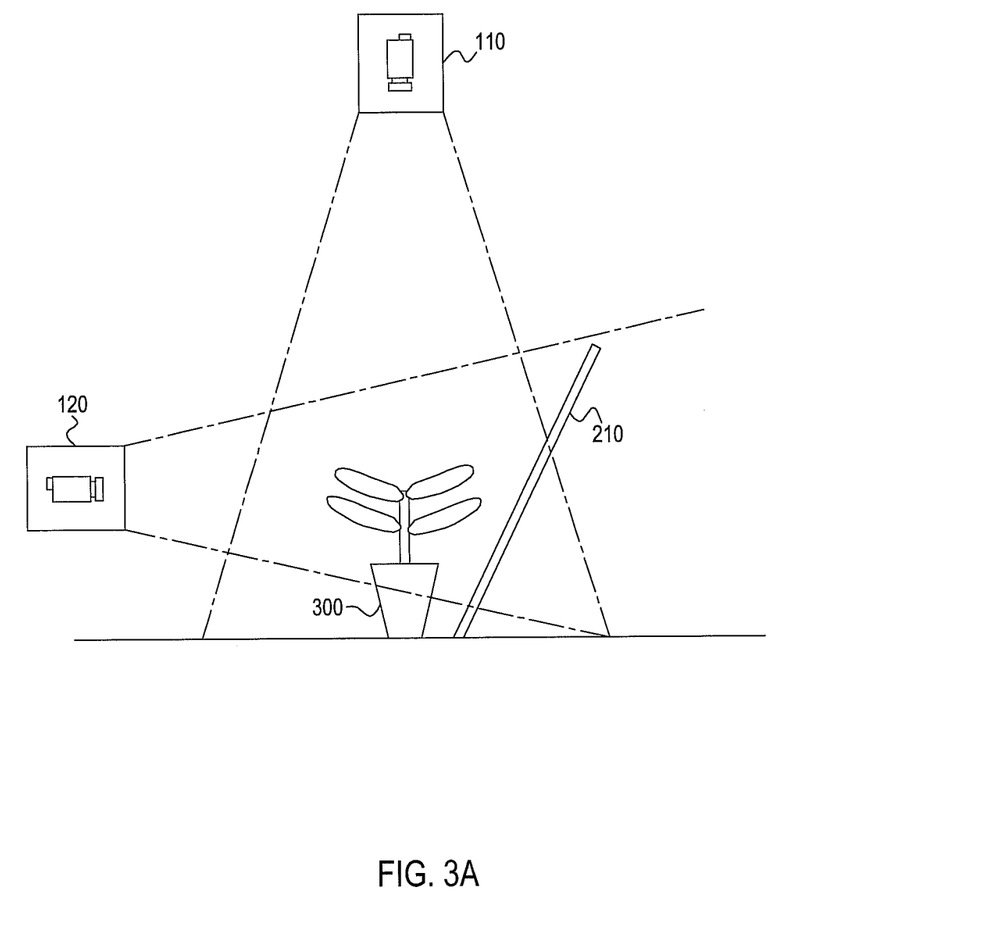
FIG. 3A is a schematic view of an image capture device according to a second embodiment of the present invention.
Figure 3B:
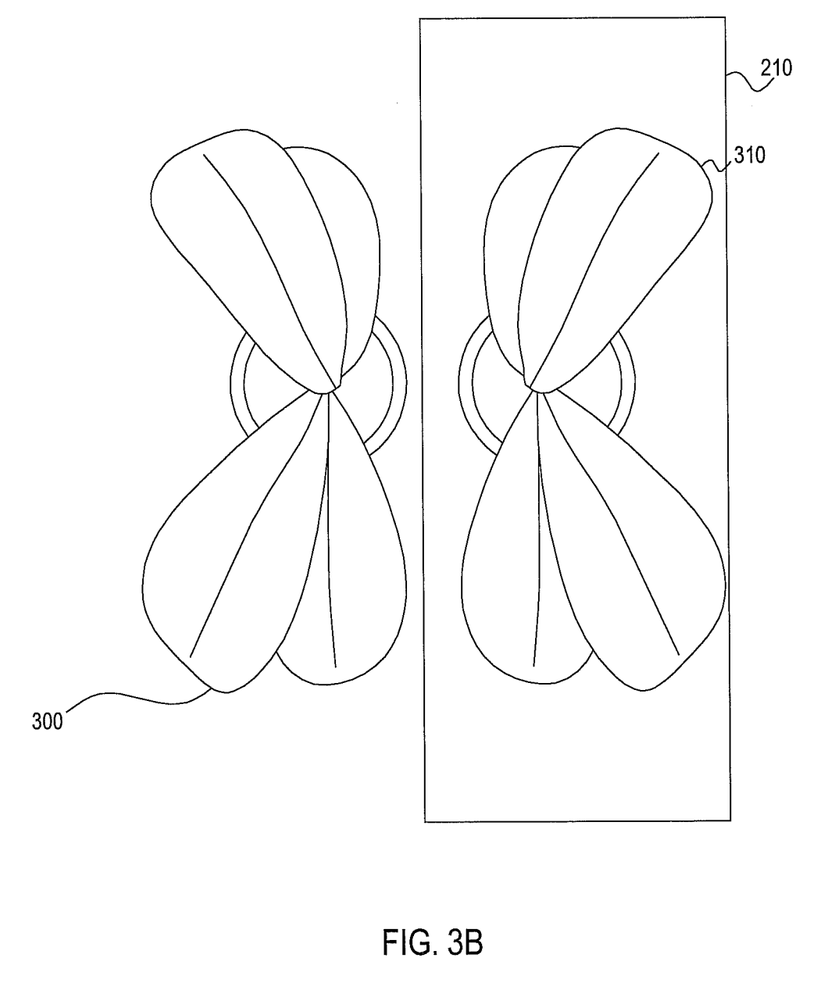
FIG. 3B is a schematic view of a top image according to the second embodiment of the present invention.
Figure 4:
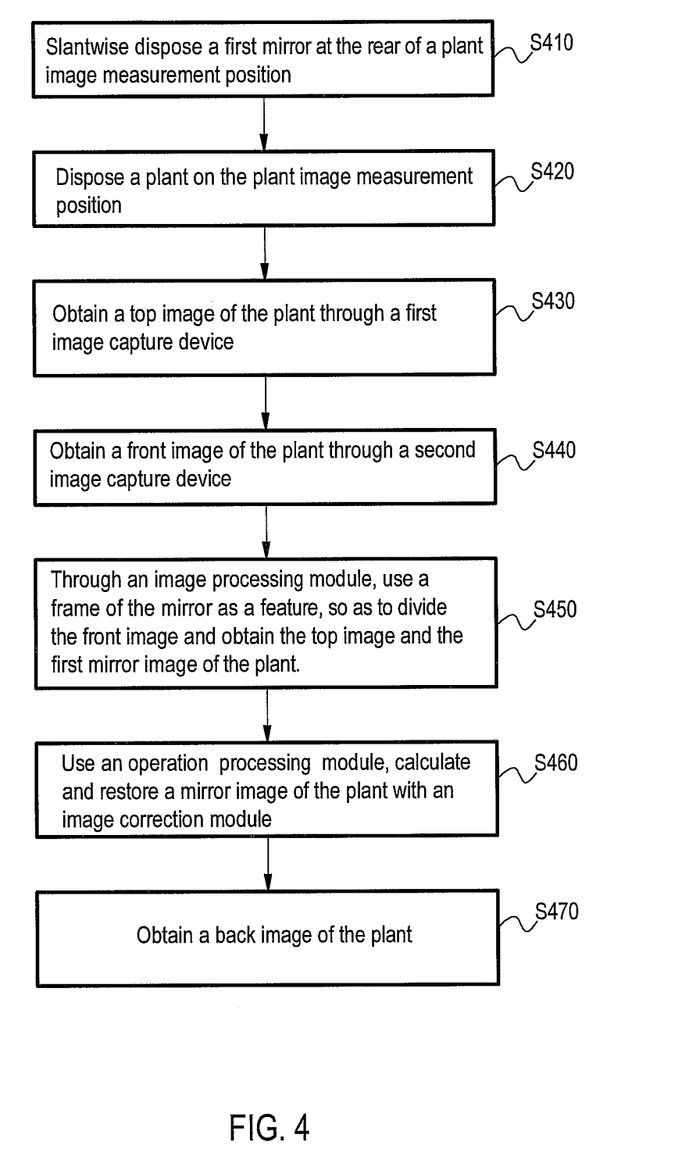
FIG. 4 is a flow chart of steps according to the second embodiment of the present invention.

Referring to FIG. 3A, FIG. 3B and FIG. 4, FIG. 3A is a schematic view of a plant image capture device according to a second embodiment of the present invention. FIG. 3B is a schematic view of a top image of a plant according to an embodiment of the present invention. FIG. 4 is a flow chart of steps according to the second embodiment of the present invention. For convenience of illustration, relevant element numerals described in FIG. 4 are all denoted with corresponding element numerals in FIG. 3A.

Main implementation steps are as follows: a first mirror is slantwise disposed at the rear of a plant image measurement position (step S410). Then, a plant is disposed on the image measurement position (step S420), a top image of the plant is obtained through a first image capture device (step S430), and then a front image of the plant is obtained through a second image capture device (step S440).

In this embodiment, the first image capture device 110 is disposed above the plant 300, a mirror (that is a first mirror) is disposed at the rear of the plant 300, and a second image capture device 120 is disposed in the front of the plant 300, so as to obtain a front image of the plant 300.

Secondly, through an image processing module, a frame of the mirror is used as a feature, so as to divide the front image and obtain a top image (that is, the direct image) and an mirror image (that is, the first mirror image) of the plant (step S450). Then, by using of an operation processing module, a mirror image of the plant is calculated and restored with an image restoration formula (step S460). As a result, a back image of the plant may be obtained (step S470).

In this embodiment, as shown in FIG. 3B, the image captured through the first image capture device 110 includes the top image (that is, the direct image) of the plant 300 itself, a frame of the mirror at the rear of the plant 300, and the mirror image of the plant reflected in the mirror (that is, the first mirror image).

Figure 7:
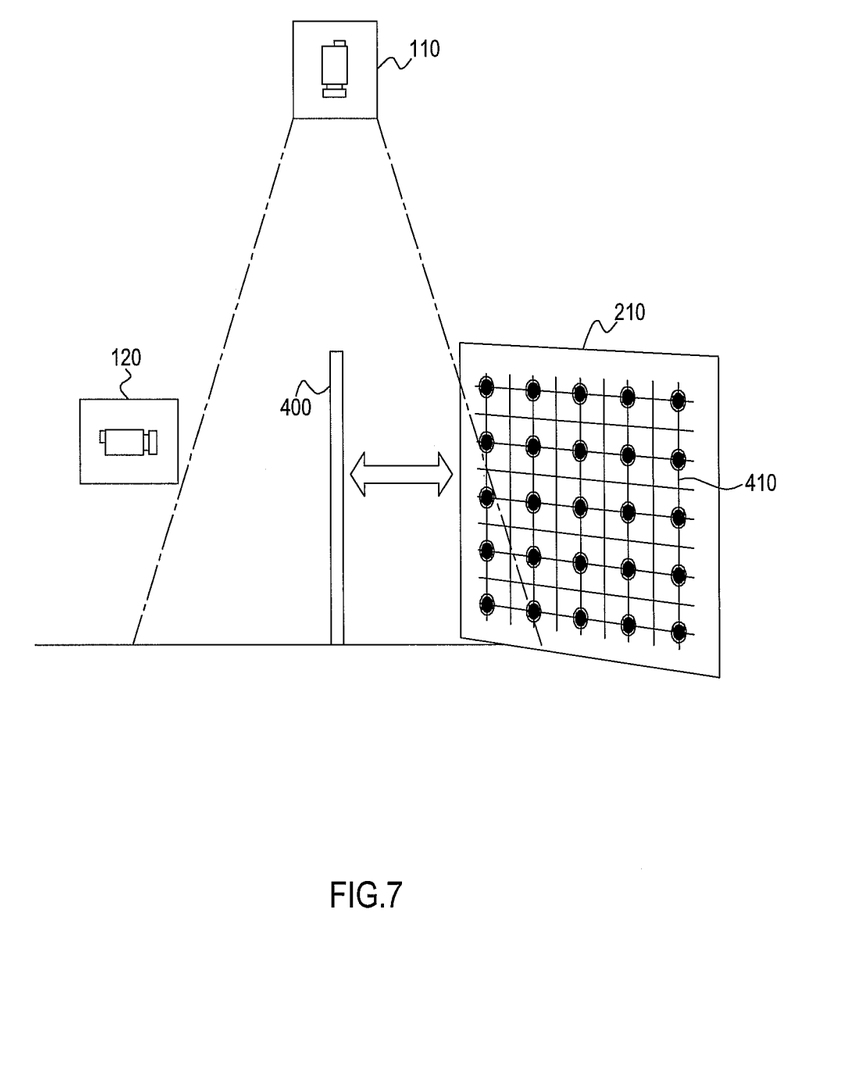
FIG. 7 is a schematic view of an image capture device obtaining an image restoration formula according to the present invention.
Figure 8:
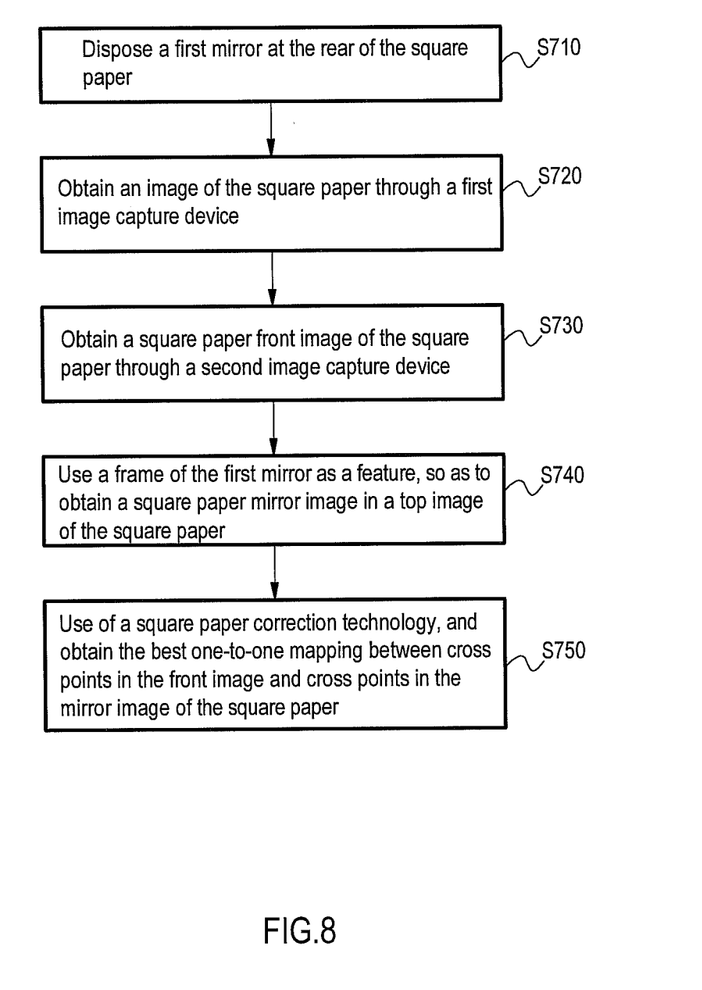
FIG. 8 is a flowchart of steps of obtaining the image restoration formula according to the present invention.

Referring to FIG. 7 and FIG. 8 for the foregoing image restoration method, and detailed content is described hereinafter.

Figure 5A:
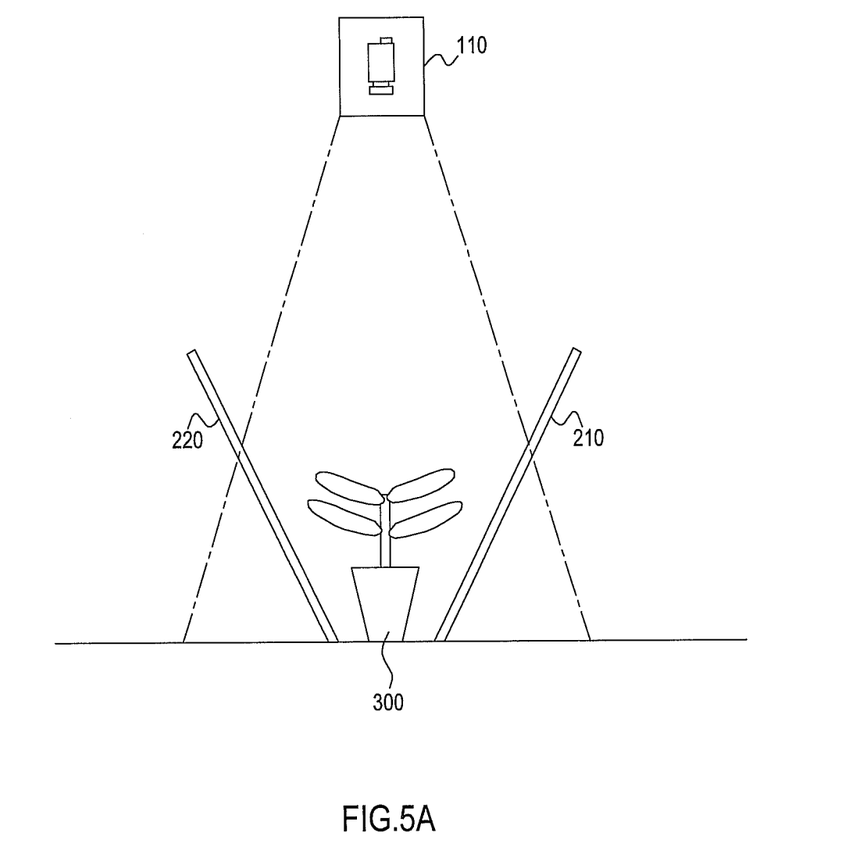
FIG. 5A is a schematic view of an image capture device according to a third embodiment of the .present invention.
Figure 5B:
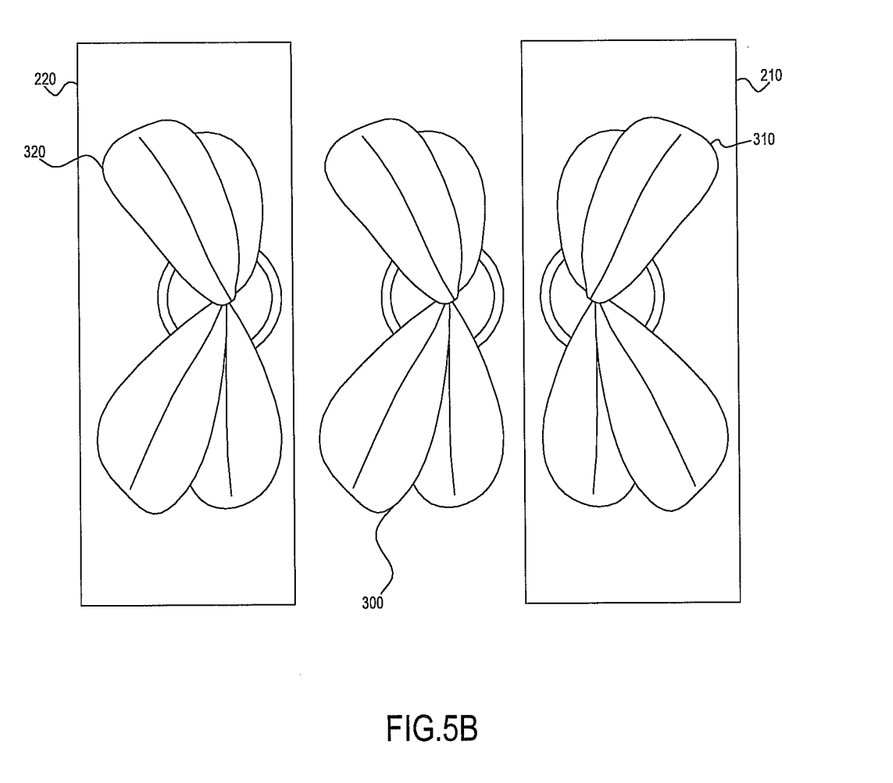
FIG. 5B is a schematic view of a top image according to the third embodiment of the present invention.
Figure 6:
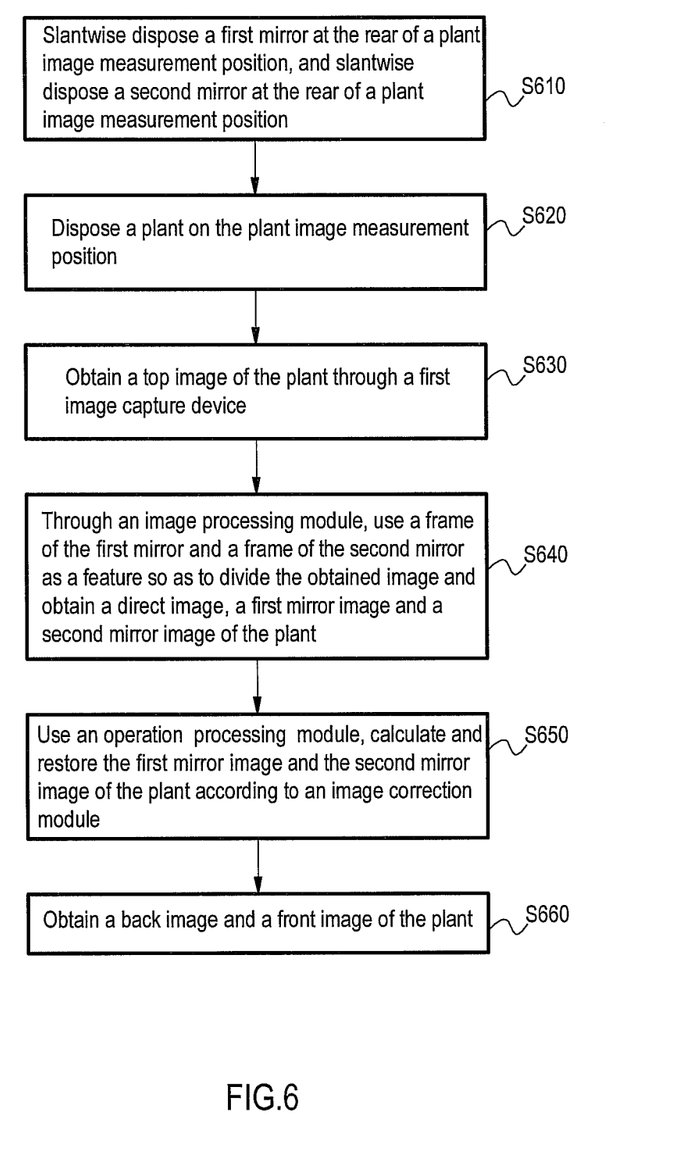
FIG. 6 is a flow chart of steps according to the third embodiment of the present invention.

Then, referring to FIG. 5A, FIG. 5B and FIG. 6, FIG. 5A is a schematic view of a plant image capture device according to a third embodiment of the present invention. FIG. 5B is a schematic view of plant image capture according to the third embodiment of the present invention. FIG. 6 is a flow chart of steps according to the third embodiment of the present invention. For simplicity of illustration, relevant element numerals described in FIG. 6 are all denoted with corresponding element numerals in FIG. 5A.

Main implementation steps are as follows: a first mirror 210 is slantwise disposed at the rear of a plant image measurement position, and a second mirror 220 is slantwise disposed in the front of the plant image measurement position (step S610); the first mirror 210 and the second mirror 220 are placed with V shape, and in the middle of the first mirror 210 and the second mirror 220, a plant 300 is disposed on the plant image measurement position (step S620). Much further, the plant 300 may be conveyed to the image measurement position 160 through a conveyor belt 150 (referring to FIG. 1), so as to obtain a top image through an image capture device 110 (step S630). The image obtained by the first image capture device includes a direct image (top image), a first mirror image (back image) and a second mirror image (front image) of the plant 300.

In this embodiment, the device used in the foregoing steps S610 to step S630 is shown in FIG. 3A, the image capture device 110 is disposed above the plant 300, the first mirror 210 is disposed at the rear of the plant 300, and the second mirror 220 is disposed in the front of the plant 300.

Secondly, through an image processing module, a frame of the first mirror 210 and a frame of the second mirror 220 are used as a feature, so as to divide the obtained image and obtain a direct image, a first mirror image and a second mirror image of the plant 300 (step S640).

In this embodiment, FIG. 5B is a schematic view, which is a drawing captured through the first image capture device 110, and what is shown is the top image of the plant 300 itself, the frame of the first mirror 210 at the rear of the plant 300 as well as the first mirror image 310 of the plant reflected in the first mirror 210, and the frame of the second mirror 220 in the front of the plant 300 as well as the second mirror image 320 of the plant reflected in the second mirror 220.

Secondly, by use of an operation processing module, the first mirror image and the second mirror image of the plant are calculated and restored according to an image correction module (step S650). By use of a correction technology for measuring a square paper, a mapping between each cross point in the square paper and a corresponding cross point in an image to be restored of the plant (that is, in the first mirror image) may be obtained, and this mapping may be provided for the operation processing module to restore the first mirror image of the plant 300, so as to obtain a first image of the plant 300, that is, a back image. When the first mirror 210 and the second mirror 220 are placed with V shape and the placement angles are the same, the previous mapping established through the first mirror image also may be used to calculate and restore the second mirror image of the plant 300. Generally, when the placement angles of the mirrors are different (that is, slant extents are different), it is required to establish different mappings.

Finally, a back image and a front image of the plant are obtained (step S660).

In this embodiment, plant feature capture may be performed on a restored image.

Referring to FIG. 7 and FIG. 8, FIG. 7 is a schematic view of a plant image capture device obtaining an image restoration formula according to the present invention; and FIG. 8 is a flowchart of steps of obtaining the mapping between each cross point in the front image and the corresponding cross point in the mirror image of the square paper according to the present invention. Relevant element numerals described in FIG. 8 are all denoted with corresponding element numerals in FIG. 7.

Main implementation steps are as follows: firstly, a square paper 400 is disposed on a plant image measurement position, and a first mirror 210 is disposed at the rear of the square paper 400 (step S710). An image of the square paper 400 is obtained through a first image capture device 110 (step S720). A square paper front image of the square paper 400 is obtained through a second image capture device 120 (step S730). Secondly, a frame of the first mirror is used as a feature, so as to obtain a square paper mirror image 410 in a top image of the square paper 400, that is, the first mirror image (step S740). By use of a square paper correction technology, the best one-to-one mapping between cross points in the front image and their corresponding cross points in the mirror image of the square paper is obtained (step S750).

The method for obtaining the mapping between each cross point in the front image and the corresponding cross point in the mirror image of the square paper is detailed as follows:

obtaining the front image of the square paper through a second image capture device 120; secondly, obtaining an image of the square paper through the first image capture device 110 and the first mirror 210; secondly, using the frame of the first mirror 210 as a feature, dividing the image of the square paper and obtaining a direct image and a first mirror image in the image of the square paper, in which the first mirror image is the image of the square paper; secondly, obtaining, according to the front image, a two-dimensional plane coordinate value of each cross point in the front image of the square paper; secondly, obtaining, according to the first mirror image, a two-dimensional plane coordinate value of each cross point in the mirror image of the square paper; and according to the two-dimensional plane coordinate value of each cross point in the front image of the square paper and two-dimensional plane coordinate value of each cross point in the mirror image of the square paper, establishing a mapping.

In some embodiments, the foregoing mapping may be an image processes formula. In some other embodiments, the mapping may be an X axis coordinate calculation formula and a Y axis coordinate calculation formula. In still some other embodiments, the mapping may be as follows: a first matrix is established according to the two-dimensional plane coordinate value of each cross point of the square paper; a second matrix is established according to the two-dimensional plane coordinate value of each cross point of the square paper in the first mirror image; and a mapping between the first matrix and the second matrix is established, so as to serve as a mapping between each cross point of the square paper and a corresponding cross point in an image to be restored of the plant.

To sum up, in the present invention, an image capture device (such as: camera, camera and digital camera) is disposed above a plant and/or at a side of the plant to shoot the plant, a mirror is used to obtain mirror images of the front and the back of the plant, and then front and back images are generated through an image restoration technology. Therefore, the method disclosed by the present invention may effectively save the hardware cost.

In the implementation manner of this application, the mirror placement manner mainly may be:

(1) A mirror is slantwise placed, to enable back images of the plant to be presented in a picture of a top camera simultaneously.

(2) Two mirrors are placed with V shape, to enable a front image and a back image of the plant to be presented in a picture of a top camera simultaneously.

Then, a mirror frame is used as a feature, and after the mirror image is separated from the top image, a front mirror image and a back mirror image of the plant are extracted. Furthermore, by use of the square paper correction technology, scale information about the mirror images are obtained, and the mirror images are calculated to be restored into accurate front and back images of the plant.

Although the present invention has been disclosed through the foregoing embodiments, they are not intended to limit the present invention. Equivalent replacements of variations and modifications made by persons skilled in the art without departing from the spirit and the scope of the present invention still fall within the protection scope of the present invention.

What is claimed is:

1. A plant image capture device, comprising:
   a first mirror, disposed at a side of an image measurement position, so as to generate a first mirror image of a plant disposed on the image measurement position;
   a first image capture device, used to obtain at least one image comprising a direct image and the first mirror image of the plant;
   an image processing module, using a frame of the first mirror as a feature, dividing the obtained at least one image and obtaining the direct image and the first mirror image; and
   an operation processing module, restoring the first mirror image, so as to obtain a first image of the plant.

2. The plant image capture device according to claim 1, wherein the first mirror is placed slantwise, so that a back of the plant is slantwise presented in the at least one image obtained by the first image capture device, and the first image is a back image of the plant.

3. The plant image capture device according to claim 1, further comprising a second mirror, disposed at another side of the image measurement position, so as to generate a second mirror image of the plant.

4. The plant image capture device according to claim 3, wherein the first image capture device is further used to obtain at least one image comprising the direct image, the first mirror image and the second mirror image of the plant; and, the image processing module further uses the frame of the first mirror and the frame of the second mirror as a feature, which divides the obtained at least one image and obtains the direct image, the first mirror image and the second mirror image.

5. The plant image capture device according to claim 3, wherein the first mirror and the second mirror are placed with V shape, the direct image is a top image of the plant, the first mirror image is a back image of the plant, and the second mirror image is a front image of the plant.

6. The plant image capture device according to claim 1, further comprising a second image capture device, for obtaining a front image of the plant,
wherein the first image is a back image of the plant, and the direct image is a top image of the plant.

7. The plant image capture device according to claim 1, further comprising:
a conveyor belt, for transporting the plant to the image measurement position.

8. The plant image capture device according to claim 1, wherein the operation processing module further comprises an image correction module, for obtaining, by use of a correction technology for measuring a square paper, the best one-to-one mapping between cross points in a front image and cross points in a mirror image of the square paper, so that the operation processing module processes the first mirror image of the plant according to the mapping, and obtains the first image of the plant.

9. A plant image capture method, comprising:
providing a first mirror, disposed at a side of an image measurement position, so as to generate a first mirror image of a plant disposed on the image measurement position;
obtaining, by a first image capture device, at least one image comprising a direct image and the first mirror image of the plant;
using, by an image processing module, a frame of the first mirror as a feature, dividing the obtained at least one image and obtaining the direct image and the first mirror image; and
restoring, by an operation processing module, the first mirror image, so as to obtain a first image of the plant.

10. The plant image capture method according to claim 9, further comprising:
providing a second mirror, disposed at another side of the image measurement position, so as to generate a second mirror image of the plant.

11. The plant image capture method according to claim 10, further comprising:
obtaining, by the first image capture device, at least one image comprising the direct image, the first mirror image and the second mirror image of the plant; and
using, by the image processing module, a frame of the first mirror and a frame of the second mirror as a feature, dividing the obtained at least one image and obtaining the direct image, the first mirror image and the second mirror image.

12. The plant image capture method according to claim 9, further comprising:
providing a conveyor belt, so as to transport the plant to the image measurement position.

13. The plant image capture method according to claim 9, further comprising:
obtaining, by an image correction module, by use of a correction technology for measuring a square paper, a the best one-to-one mapping between cross points in a front image and cross points in a mirror image of the square paper, so that the operation processing module processes the first mirror image of the plant according to the mapping, and obtains the first image of the plant.

14. The plant image capture method according to claim 13, wherein a method for obtaining the best one-to-one mapping between cross points in the front image and cross points in the mirror image of the square paper comprises:
disposing the square paper on the image measurement position of the plant;
obtaining an image of the square paper through the first image capture device and the first mirror;
obtaining the front image of the square paper through a second image capture device;
using the frame of the first mirror as a feature, dividing the image of the square paper and obtaining a direct image and a first mirror image in the image of the square paper;
obtaining, according to the front image, a two-dimensional plane coordinate value of each cross point in the front image of the square paper;
obtaining, according to the first mirror image, a two-dimensional plane coordinate value of each cross point in the mirror image of the square paper; and
according to the two-dimensional plane coordinate value of each cross point in the front image of the square paper and two-dimensional plane coordinate value of each cross point in the mirror image of the square paper, establishing a mapping.

15. The plant image capture method according to claim 13, wherein the mapping is an image processes formula.

16. The plant image capture method according to claim 13, wherein the mapping is an X axis coordinate calculation formula and a Y axis coordinate calculation formula.

17. The plant image capture method according to claim 13, further comprising:
according to the two-dimensional plane coordinate value of each cross point of the square paper, establishing a first matrix;
according to the two-dimensional plane coordinate value of each cross point of the square paper in the first mirror image, establishing a second matrix; and
establishing a mapping between the first matrix and the second matrix, so as to serve as a mapping between each cross point of the square paper and a corresponding cross point in an image to be restored of the plant.

\* \* \* \* \*